(12) United States Patent
Kanamarlapudi et al.

(10) Patent No.: US 11,825,348 B2
(45) Date of Patent: Nov. 21, 2023

(54) METHODS AND APPARATUS FOR SPLIT PDCP SCHEDULING

(71) Applicant: QUALCOMM Incorporated, San Diego, CA (US)

(72) Inventors: Sitaramanjaneyulu Kanamarlapudi, San Diego, CA (US); Baojun Lu, San Diego, CA (US); Leena Zacharias, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 12 days.

(21) Appl. No.: 17/372,051

(22) Filed: Jul. 9, 2021

(65) Prior Publication Data

US 2022/0030464 A1    Jan. 27, 2022

Related U.S. Application Data

(60) Provisional application No. 63/056,482, filed on Jul. 24, 2020.

(51) Int. Cl.
*H04W 28/082*    (2023.01)
*H04W 28/06*    (2009.01)
(Continued)

(52) U.S. Cl.
CPC ......... *H04W 28/082* (2023.05); *H04L 1/1896* (2013.01); *H04W 28/04* (2013.01); *H04W 28/06* (2013.01); *H04W 80/02* (2013.01)

(58) Field of Classification Search
CPC ... H04L 1/1851; H04L 1/1887; H04L 1/1896; H04L 5/001; H04L 5/0092; H04L 5/0094; H04W 28/04; H04W 28/06; H04W 28/0819; H04W 28/085; H04W 28/0908; H04W 28/0933; H04W 76/15; H04W 80/02; H04W 72/50–569
See application file for complete search history.

(56) References Cited

U.S. PATENT DOCUMENTS

2017/0353914 A1    12/2017 Jung et al.
2018/0206282 A1    7/2018 Singh et al.
(Continued)

OTHER PUBLICATIONS

International Search Report and Written Opinion—PCT/US2021/041320—ISA/EPO—dated Oct. 5, 2021.

*Primary Examiner* — Pao Sinkantarakorn
(74) *Attorney, Agent, or Firm* — Procopio, Cory, Hargreaves & Savitch LLP/Qualcomm Incorporated

(57) ABSTRACT

The apparatus of wireless communication may include a transmitter connected to a receiver through a split carrier including a first carrier and a second carrier, and the transmitter may be configured to schedule transmission data at PDCP level by splitting the transmission data to first packets and second packets based on a relative scheduling delay between the first carrier and the second carrier, and scheduling the first packets and the second packets on different links based on a scheduling proportion, and transmit the first packets via the first carrier and the second packets via the second carrier. The transmitter may sequentially transmit the transmission data starting at an offset as the second packets to a second RLC level associated with the second carrier, wherein the offset is determined based on the relative scheduling delay.

31 Claims, 9 Drawing Sheets

(51) Int. Cl.
*H04L 1/1867* (2023.01)
*H04W 28/04* (2009.01)
*H04W 80/02* (2009.01)

(56) References Cited

U.S. PATENT DOCUMENTS

| | | | |
|---|---|---|---|
| 2020/0275519 A1* | 8/2020 | Sharma | H04W 76/15 |
| 2021/0296758 A1* | 9/2021 | Kim | H04B 1/006 |
| 2021/0345454 A1* | 11/2021 | Dhanapal | H04W 28/0268 |
| 2021/0377804 A1* | 12/2021 | Sivaraj | H04W 28/10 |
| 2022/0007443 A1* | 1/2022 | Xu | H04W 76/15 |
| 2022/0167221 A1* | 5/2022 | Lee | H04W 36/08 |

\* cited by examiner

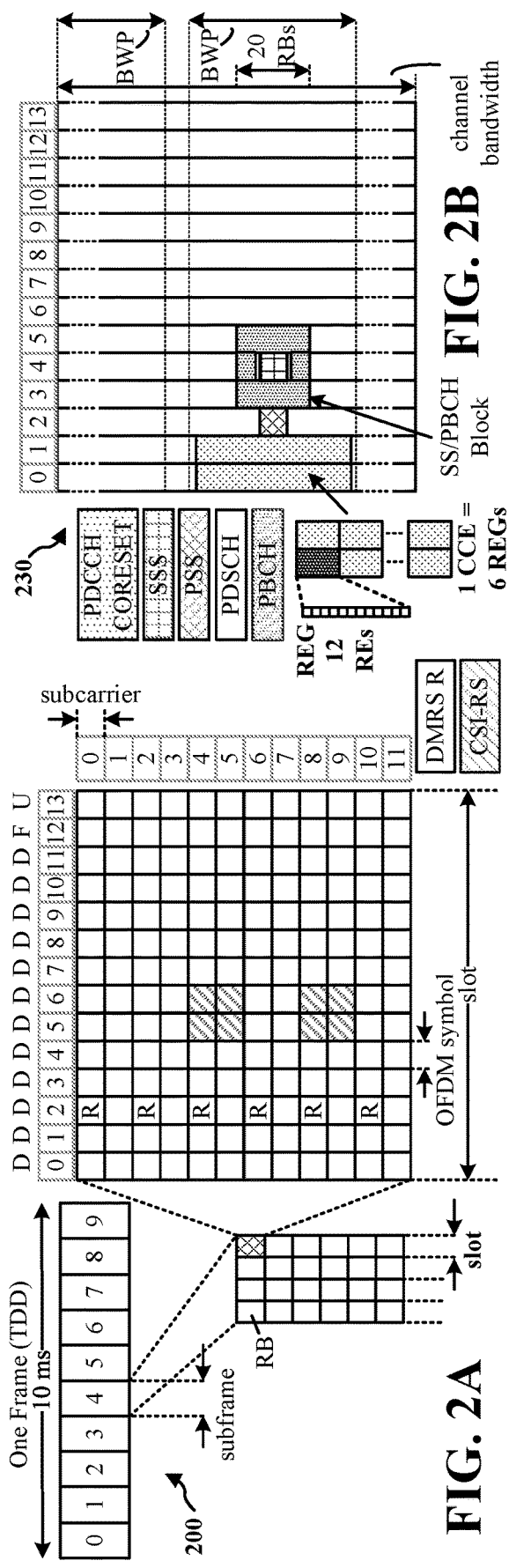
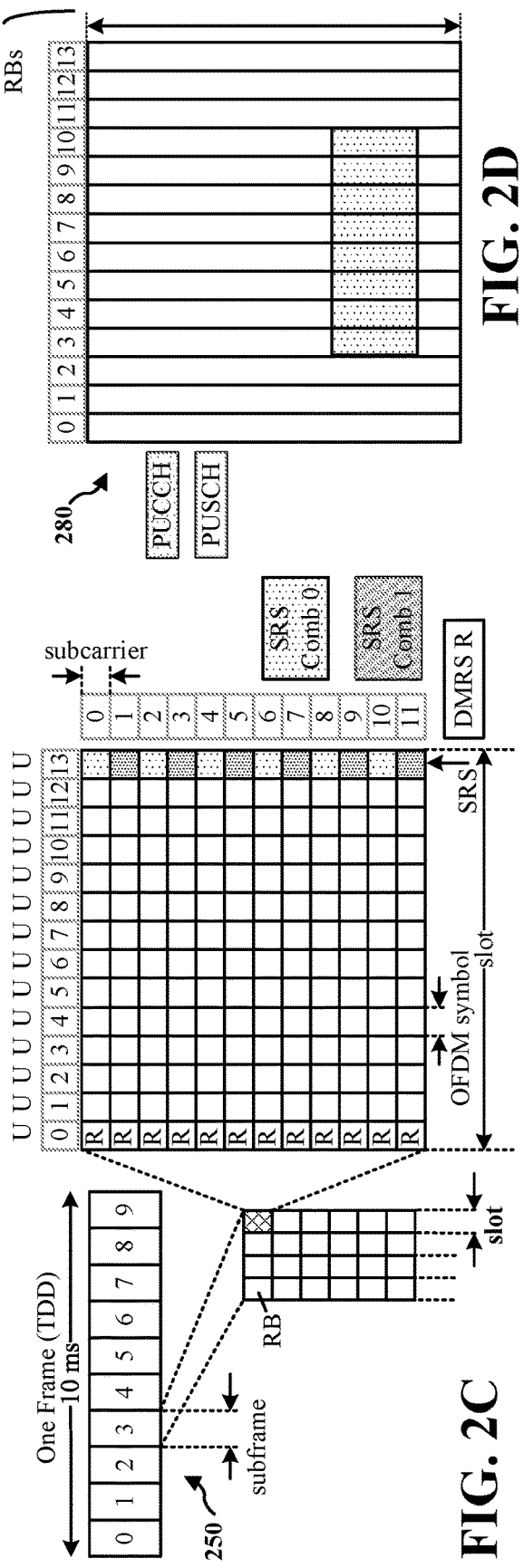
FIG. 2A
FIG. 2B
FIG. 2C
FIG. 2D

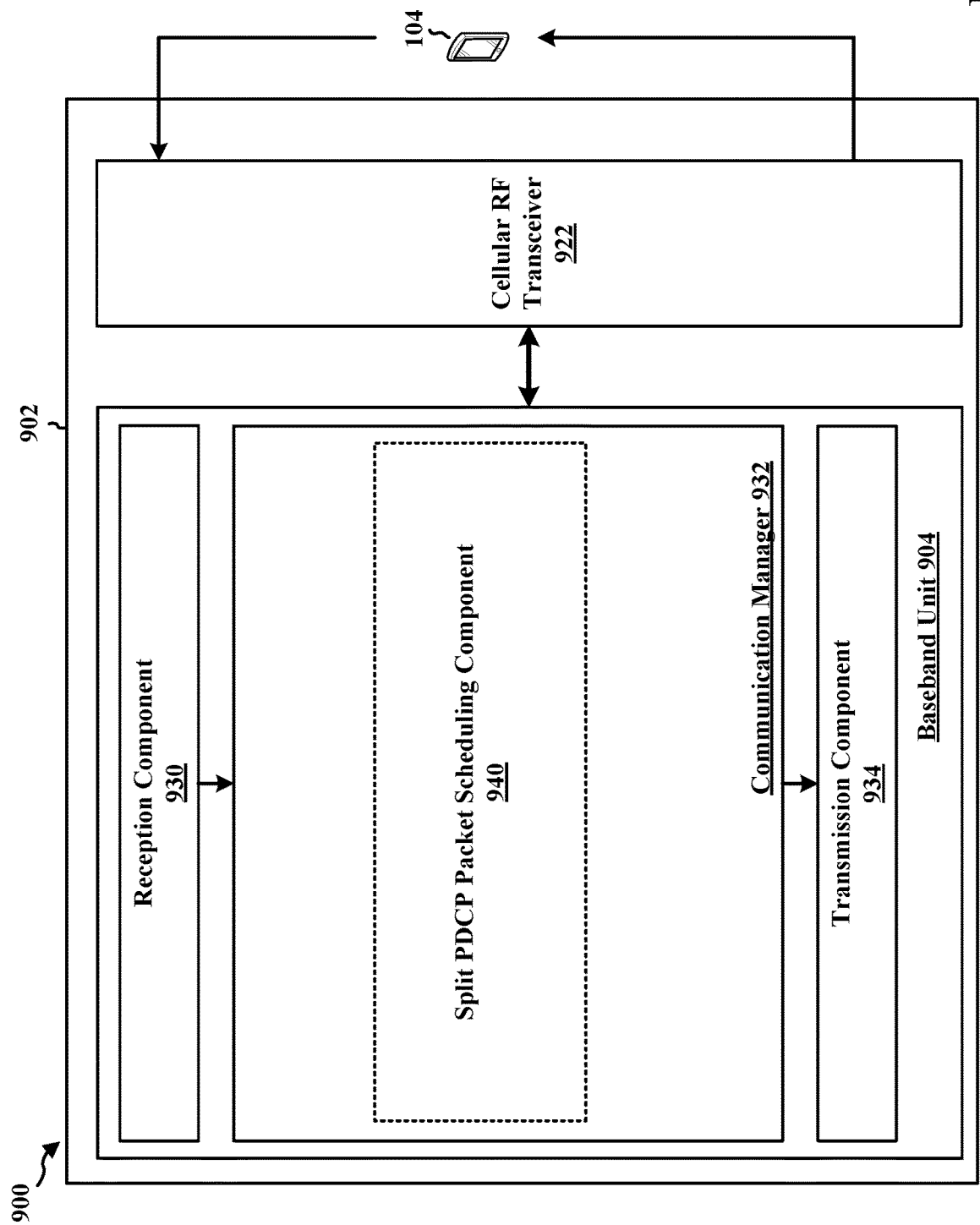

METHODS AND APPARATUS FOR SPLIT PDCP SCHEDULING

CROSS REFERENCE TO RELATED APPLICATION(S)

This application claims the benefit of and priority to U.S. Provisional Application Ser. No. 63/056,482, entitled "METHOD AND APPARATUS FOR SPLIT PDCP SCHEDULING" and filed on Jul. 24, 2020, which is expressly incorporated by reference herein in its entirety.

TECHNICAL FIELD

The present disclosure relates generally to communication systems, and more particularly, to methods and apparatus for a split packet data convergence protocol (PDCP) scheduling based on the relative scheduling delay.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a transmitter connected to a receiver through a split carrier including a first carrier and a second carrier, may be configured to schedule transmission data at a PDCP level by splitting the transmission data to a first set of packets and a second set of packets based on a relative scheduling delay between the first carrier and the second carrier, and scheduling the first set of packets and the second set of packets on different links based on a scheduling proportion, and transmit the first set of packets via the first carrier and the second set of packets via the second carrier. Each of the first set of packets and the second set of packets may be a set of contiguous packets or a set of non-continuous packets. Each of the first set of packets and the second set of packets may have the same size or may have different sizes. Each of the first set of packets and the second set of packets may have a same traffic type or may have different traffic types.

In some aspects, the first carrier may be for a first radio access technology (RAT) and the second carrier may be for a second RAT. The first RAT and the second RAT may be the same RAT or different RATs. In one aspect, the first RAT maybe the 5G new radio (NR) and the second RAT may be a 4G long term evolution (LTE). In another aspect, the first carrier may be the 5G NR first frequency range (FR1) carrier and the second carrier may be a 5G NR second frequency range (FR2) carrier. In another aspect, one carrier of the first carrier and the second carrier may be a terrestrial link and the other carrier of the first carrier and the second carrier may be a non-terrestrial link. Here, the relative scheduling delay between the first carrier and the second carrier may be based on a difference between a first scheduling delay of the first carrier and a second scheduling delay of the second carrier, and the first scheduling delay and the second scheduling delay may be determined based on a worst-case scheduling of the first carrier and the second carrier, respectively. Here, the second scheduling delay of the second carrier may be greater than the first scheduling delay of the first carrier. The transmitter may be configured to sequentially transmit the transmission data as the first set of packets to a first radio link control (RLC) level associated with the first carrier, and sequentially transmit the transmission data starting at an offset relative to the first set of packets as the second set of packets to a second RLC level associated with the second carrier, where the offset may be determined based on the relative scheduling delay. The scheduling proportion between the first carrier and the second carrier may be determined based on at least one of loading, scheduling, or resource constraints of the first carrier and the second carrier, respectively.

The transmitter may be further configured to receive an acknowledge (ACK) signal indicating a successful transmission of the second set of packets, and sequentially transmit, in response to receiving the ACK signal, the transmission data at the offset relative to the first set of packets as the second set of data to the second RLC level associated with the second carrier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 9 is a diagram illustrating an example of a hardware implementation for an example apparatus.

DETAILED DESCRIPTION

Figure 1:
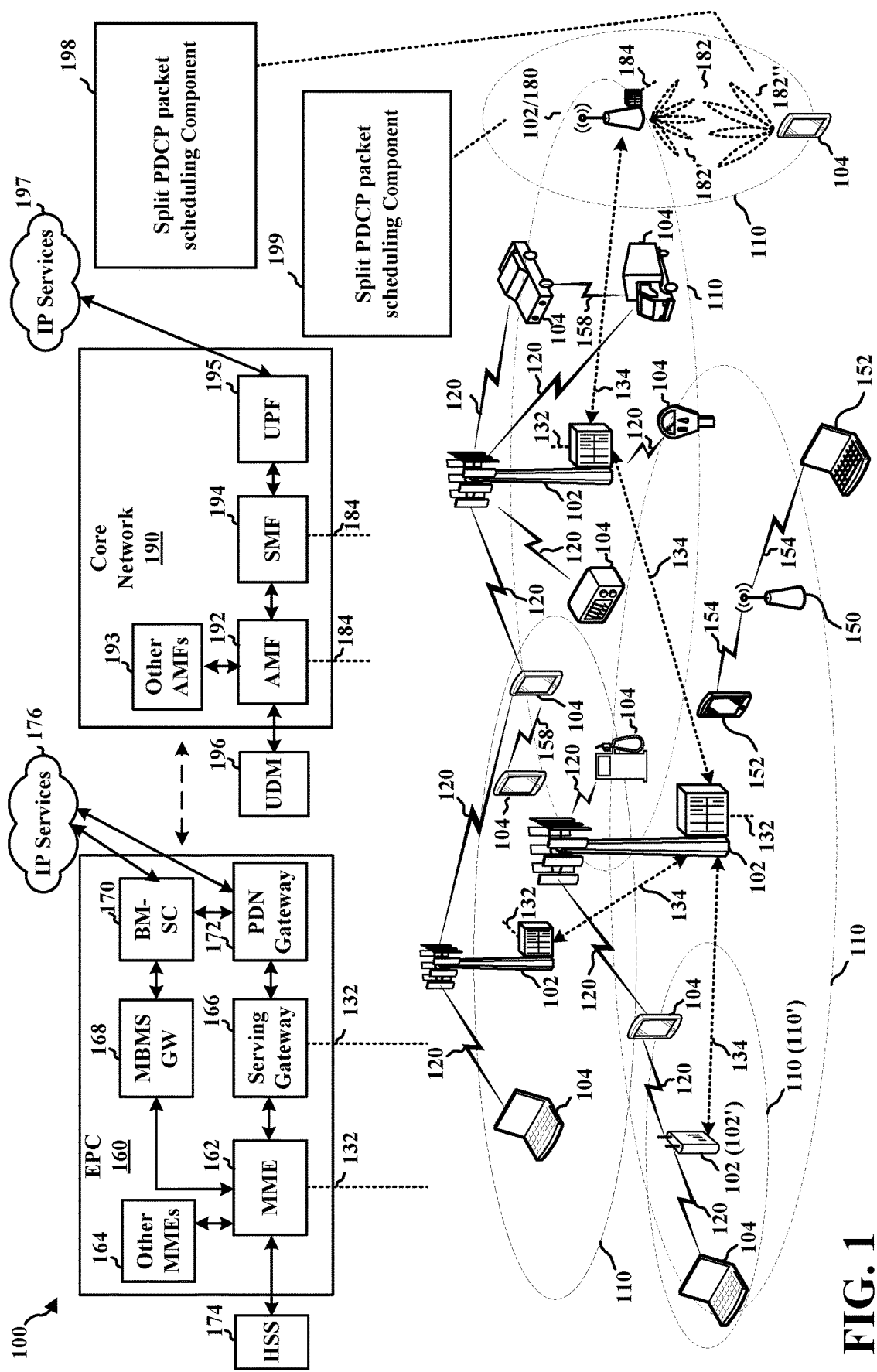
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a split PDCP packet scheduling component 198 configured to schedule transmission data at a PDCP level by splitting the transmission data to a first set of packets and a second set of packets based on a relative scheduling delay between the first carrier and the second carrier, and scheduling the first set of packets and the second set of packets on different links based on a scheduling proportion, and transmit the first set of packets via the first carrier and the second set of packets via the second carrier. In certain aspects, the base station 180 may include a split PDCP packet scheduling component 199 configured to schedule transmission data at a PDCP level by splitting the transmission data to a first set of packets and a second set of packets based on a relative scheduling delay between the first carrier and the second carrier, and scheduling the first set of packets and the second set of packets on different links based on a scheduling proportion, and transmit the first set of packets via the first carrier and the second set of packets via the second carrier. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
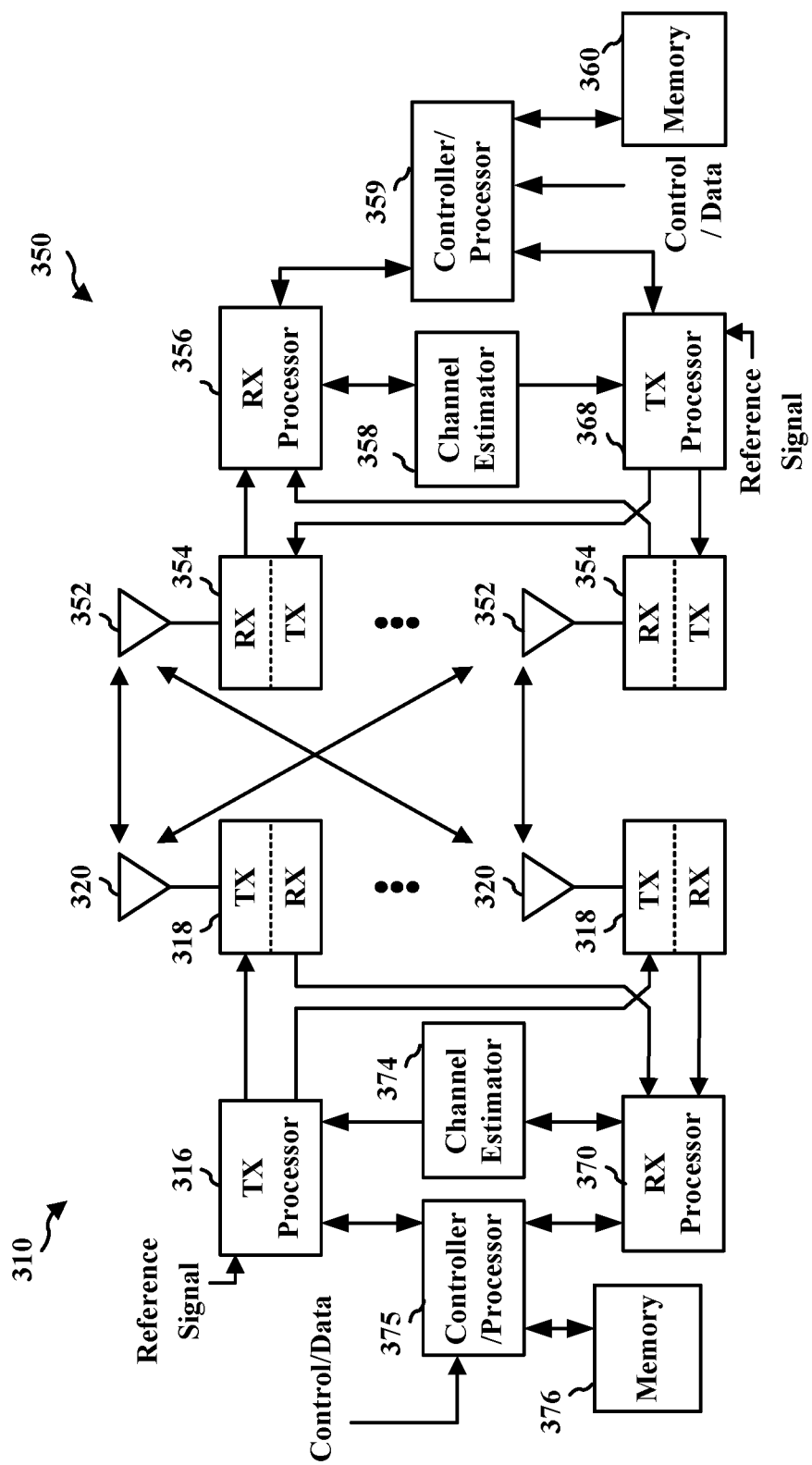
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

A transmitter may be the UE and/or the base station. The transmitter may have a dual carrier split functionality, and the data for transmission may be split at PDCP level between two RAT specific RLCs. In some aspects, the two RATs may include any type of RAT and may be same or different RATs. In one aspect, in an EUTRA-NR (EN) Dual Connectivity (DC) (EN-DC) configuration, the NR PDCP Data may be split between LTE RLC and NR RLC. In another aspect, in an NR-DC configuration, the NR PDCP Data may be split between NR FR1 RLC and NR FR2 RLC. In another aspect, the two RATs may include any combination of at least two of the NR FR1, NR FR2+, NR FR3, NR FR4, etc. In another aspect, a combination of a master cell group (MCG) and a secondary cell group (SCG) may include a terrestrial link and a non-terrestrial link, and the PDCP data may be split between the terrestrial link and the non-terrestrial link.

The HARQ BLER is inevitable and non-zero in any practical radio network, which means that some physical layer transmission on the data channel (e.g., PDSCH) will be lost and be retransmitted with some form of redundancy concept. For mmW communication, this is one of significant factors in radio coverage. Whatever physical layer transmission that is not recovered through HARQ Retransmissions is referred to as HARQ failure, and may go through the RLC level retransmissions to recover.

In an UL transmission, a time delay of the RLC level retransmissions reaching the base station may be represented as a function of various configuration and scheduling parameters, and a total UL time delay at the UE to transmit the RLC NACK from the time hole $T_{UL\_NACK\_TX\_DELAY}$ may be calculated as below:

$$T_{UL\_NACK\_TX\_DELAY} = T_{DL\_HOLE\_TO\_UL\_NACK} + T_{UL\_GRANT\_REQ} + T_{UL\_GRANT\_PHY} + T_{UL\_LCP\_DELAY} + T_{UL\_HARQ\_DELAY}.$$

Here, $T_{DL\_HOLE\_TO\_UL\_NACK}$ may refer to a time delay in triggering NACK in UL from the time the hole is seen in DL based on parameters $T_{reassembly}$ and $T_{statusProhibit}$ at RLC, $T_{UL\_GRANT\_REQ}$ may refer to a time delay for next available UL opportunity to request for Grant through SR and BSR (If not available), $T_{UL\_GRANT\_PHY}$ may refer to a time delay for next available UL Grant configuration at PHY layer, $T_{UL\_LCP\_DELAY}$ may refer to a time delay for next available opportunity to send the information as per LCP procedure in MAC TB encoding, and $T_{UL\_HARQ\_DELAY}$ may refer to a transmit delay to reach packet to base station due to HARQ retransmissions.

In a DL transmission, a time delay of the RLC level retransmissions reaching the UE may be represented as a function of various configuration, and a total DL time delay from the base station to transmit the RLC NACK seen to RLC retransmission reaching UE $T_{DL\_RETX\_DELAY}$ may be calculated as below:

$$T_{DL\_RETX\_DELAY} = T_{UL\_NACK\_PROCESS} + T_{UL\_RETX\_TO\_MAC} + T_{DL\_LCP\_DELAY} + T_{DL\_HARQ\_DELAY}.$$

Here, $T_{UL\_NACK\_PROCESS}$ may refer to a time for RLC to process the received UL CONTROL PDU with the RLC NACK, $T_{UL\_RETX\_TO\_MAC}$ may refer to a time to prepare and keep RLC PDUs to MAC, $T_{DL\_LCP\_DELAY}$ may refer to a time delay to transmit the RLC PDUs over OTA, scheduling delay, depending on buffers and priority with respect to data already in pipeline, and $T_{DL\_HARQ\_DELAY}$ may refer to a time delay to transmit Delay to Reach packet to UE due to HARQ delays.

A large PDCP DL window build up may occur in various scenarios based such as the HARQ BLER and RLC BLER at single RAT level, the HARQ BLER and RLC BLER at different RAT level, a scheduling gap between different RAT at PHY level or a scheduling gap between different RAT at PDCP level.

The UE may go through a memory full condition while waiting for the retransmissions to converge at the PDCP level, and the PDCP of the UE may perform the PDCP memory flush. The PDCP memory flush may include the steps of the PDCP flushing the packets from the lower edge of the window to relieve some memory, the PDCP updating the lower edge to a newer value. PDCP may accept new packets coming to fill the holes from updated lower boundary (or a lower threshold) to upper boundary (or an upper threshold), and the PDCP may discard the incoming packets that are below the updated lower edge, as Out Of Window (OOW packets), and opportunistically updated, as part of PDCP lower edge update, corresponding RLC level lower edge.

Figure 4:
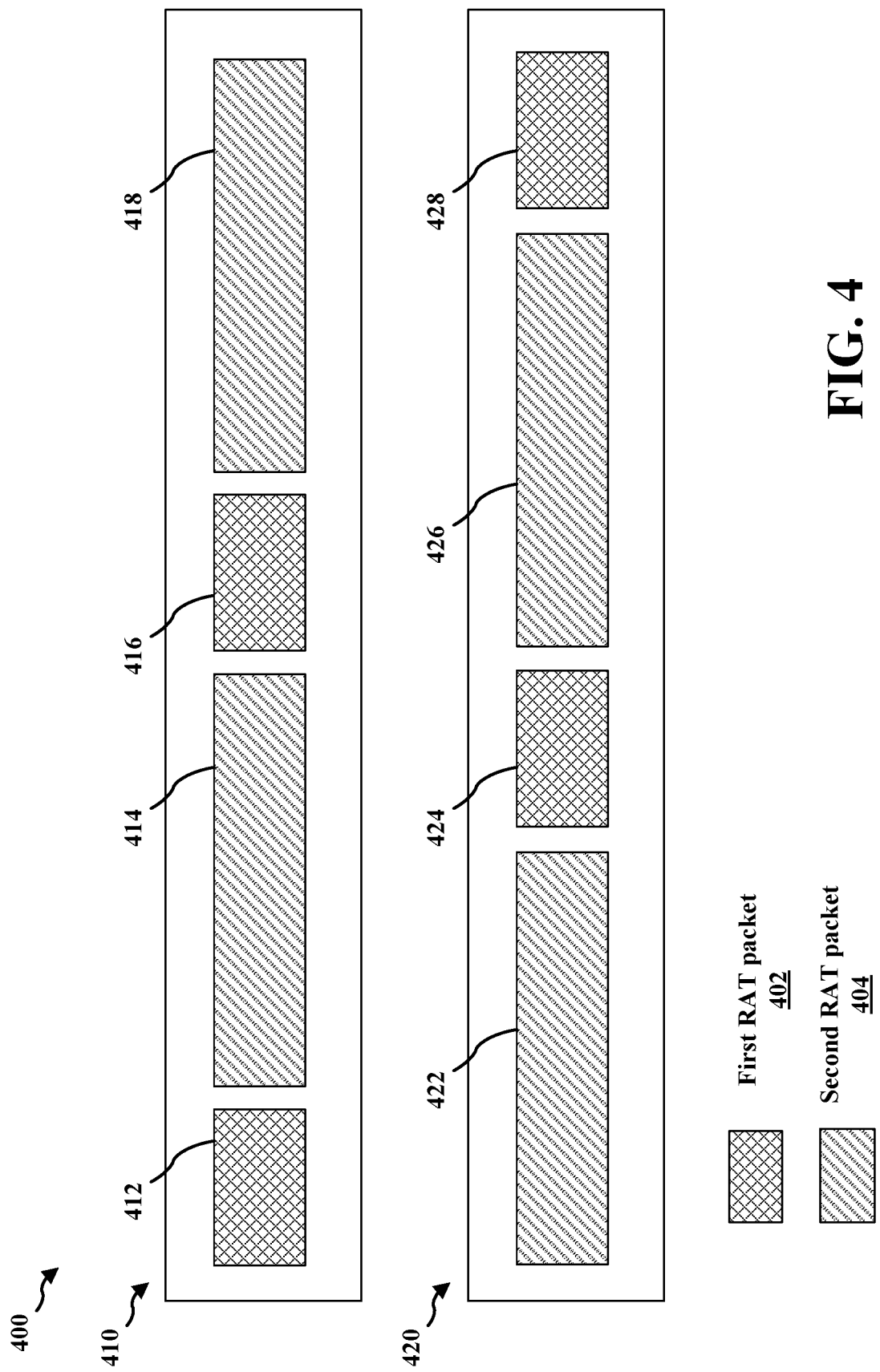
FIG. 4 is a diagram illustrating examples of split PDCP packets.

FIG. 4 is a diagram 400 illustrating examples of split PDCP packets. The diagram 400 may include a first diagram 410 and a second diagram 420. The first diagram 410 illustrates a split PDCP packet of an in-order PDCP packet split, and the second diagram 420 may illustrate a split PDCP packet of a forward looking PDCP packet split. The first diagram 410 and the second diagram 420 may include combination of a first RAT packet 402 and a second RAT packet 404.

In some aspects, the two RATs may include any type of RAT and may be same or different RATs. In one aspect, in an EN-DC configuration, the first RAT packet 402 may be an LTE packet and the second RAT packet 404 may be an NR packet. In another aspect, in an NR-DC configuration, the first RAT packet 402 may be an NR FR1 packet and the second RAT packet 404 may be an NR FR2 packet. In another aspect, the two RATs may include any combination of at least two of the NR FR1, NR FR2+, NR FR3, NR FR4, etc. In another aspect, a combination of a master cell group (MCG) and a secondary cell group (SCG) may include a terrestrial link and a non-terrestrial link, and the PDCP data may be split between the terrestrial link and the non-terrestrial link.

In some aspects, each of the first RAT packet 402 and the second RAT packet 404 may have a same traffic type or different traffic types. Here, the traffic type may include at least one of an application, a logical channel, quality of service (QoS), packet data network (PDN), network slice type, or any user specific traffic type associated with the RAT packet 402 and the second RAT packet 404.

The first diagram 410 may illustrate a split PDCP packet of the in-order PDCP packet split. The transmitter may perform the in-order split to split the transmission data at the PDCP level. The in-order PDCP split at the network and at the UE may split the transmission data based on the grants given to UE as provided below. The in-order PDCP split may cause packet drops.

The Ratio of the PDCP split may be determined per link proportion. For example, the ratio of the PDCP split may be 5% LTE and 95% NR. NR is scheduling on 8CC, while LTE scheduling is 1CC. For example, a first packet 412 corresponding to the PDCP sequence number (SN) 1-500 may be sent to the LTE RLC, and a second packet 414 corresponding to the PDCP SN 501-10,000 may be sent to the NR RLC. Subsequently, a third packet 416 corresponding to the PDCP sequence number (SN) 10,001-10,500 may be sent to the LTE RLC, and a fourth packet 418 corresponding to the PDCP SN 10,501-20,000 may be sent to the NR RLC.

Data available to transmit is simply split between NR and LTE based on scheduling proportion at $T_0$, not considering the relative scheduling delays. Accordingly, the LTE and the NR are expected to start transmitting packets at $T_0$. That is, the NR leg is continuing to transmit from $T_0$, while the LTE leg is transmitting after $T_0+T_{delay}$ onwards due to scheduling delays. Particularly, the scheduler may schedule the transmission in the order of the HARQ retransmission (ReTx), signaling Radio Bearer (SRB), Guaranteed Bit Rate (GBR), and Non-Guaranteed Bit Rate (Non-GBR). The data on the NR may need to be buffered for $T_0+T_{delay}$, which may cause the following issues, as provided in Table 1 below.

some packet loss to upper layers as well as some packets being discarded at the RLC/PDCP level due to the OOW packets.

The PDCP scheduling may be configured to reduce the OOW packets from the radio resource management perspective. The network may not be aware of the packet drops because the network may receive the HARQ ACKs or the RLC ACKs indicating a successful transmission, while the packets may be discarded at the receiver side due to the memory flush and the OOW packets, resulting in the upper layer packet loss. The upper layer packet loss may increase the long retransmission time (RTT) to recover through the upper layer retransmissions, resulting in bad user experiences. In some aspects, the upper layer protocol may be sensitive to retransmissions/loss/packet delay, and may cut down the Tx Scheduling or adjust the window/resource to have deteriorated user experience, e.g., TCP window scaling, video encoder scheme downgrade, etc.

The second diagram 420 illustrate split PDCP packets of the forward looking PDCP packet split. A longer recovery of the packets in a slower link compared to a faster link may cause a bottleneck, and the receiver may be stressed out with the packets that are received and buffered through the faster link. In some aspects, the forward looking PDCP scheduling between a first RLC carrying the first RAT packet 402 and a second RLC carrying the second RAT packet 404 may reduce the bottleneck in the wireless communication. For example, the first RLC may be the NR RLC carrying the NR packets and the second RLC may be the LTE RLC carrying the LTE packets.

According to the forward looking PDCP packet split, the transmitter may schedule the packets which may have a longer latency on the slower link, to ensure that the faster link data is not waiting for the slower link scheduling and/or recovery.

TABLE 1 transmission result example of in-order PDCP split

| Time | Slot | Frame | Route Status | RLC Path | Number IP Pkts | Number IP bytes | RB Cfg index | Start count | End Count |
|---|---|---|---|---|---|---|---|---|---|
| 19.31:04.436 | 55 | 54 | DELIV_DIRECT | NR | 2 | 2832 | 4 | 13876 | 13877 |
| 19.31:04.436 | 55 | 54 | DELIV_DIRECT | NR | 1 | 1416 | 4 | 13878 | 13878 |
| 19.31:04.436 | 56 | 54 | DELIV_DIRECT | NR | 4 | 4436 | 4 | 13879 | 13882 |
| 19.31:04.688 | 5 | 62 | DELIV_MEM_FC | LTE | 2 | 2832 | 4 | 18179 | 18180 |
| 19.31:04.688 | 5 | 62 | DELIV_MEM_FC | LTE | 1 | 1416 | 4 | 18181 | 18181 |

First, due to the variation in loading on the LTE leg, the scheduling may become delayed on the LTE leg, which may result in the UE first receiving and buffering the first packet 412 corresponding to the PDCP SN 501-10000 through the NR, and waiting until receiving the second packet 414 corresponding to the PDCP SN 1-500 through the LTE with a time delay of 70 ms, which may be significant for the NR communication.

Also, even when the LTE Leg is scheduled on time, the HARQ BLER and the HARQ retransmission at RLC level may involve a delay of 8 ms or more, e.g., such as having an average delay of 10 ms. There may be 1 to 2 retransmissions in a normal condition that may add close to 20 ms delay on the LTE leg, which may also be significant for the NR communication.

In some aspects, the PDCP may experience a full memory condition, either due to the scheduling delays from loading on one leg or the recovery delay from HARQ/ARQ BLER. A memory flush in response to the condition may result in In some aspects, the transmission data may be ready at $T_0$, and the transmission data may be split based on scheduling ratio as well as a relative scheduling delay to ensure that, a faster RLC leg, e.g., the NR RLC leg, may be scheduled with the data between $T_0$ to $T_0+T_{delay}$, while a slower RLC leg, e.g., the LTE RLC leg, may be scheduled with the data from $T_{delay}$. The split can be dynamically configured based on the gap between the NR leg and the LTE leg, to ensure that the LTE leg (i.e., the slower leg) may be budgeted into $T_{delay}$ relative to the NR leg (i.e., the faster leg). The configuration of the data split between the faster leg and the slower leg data split may be maintained by a relative gap of a worst-case scheduling, which is dependent on the dynamic radio condition.

In one aspect, the relative gap of the worst-case scheduling may be 70 ms, the NR data may be expected in a 0-70 ms time and the LTE may have data expected in a 70-75 ms time. If the LTE successfully transmits the data in a time duration of 30-35 ms, the LTE data may be expected from 100-105 ms (i.e., the data relative to NR by 70 ms), rather than 140 ms.

In another aspect, the PDCP packet of the second diagram 420 may have 10000 packets, the transmitter may allocate a second packet 424 corresponding to the PDCP SN 4500-5000 to the LTE, and allocate a first packet 422 corresponding to the PDCP SN 1-4500 to the NR. Similarly, the transmitter may allocate a fourth packet 428 corresponding to the PDCP SN 9950-10,000 to the LTE, and allocate a third packet 426 corresponding to the PDCP SN 5001-9500 to the NR.

According to the forward looking PDCP scheduling, the delays in the scheduling and/or recovery of the LTE packet, i.e., the packets of the slower link, may have reduced impact on the performance of the overall data transmission, since the NR traffic, i.e., the packets of the faster link, may be released to upper layers without flushing the memory. When the LTE scheduling was successful and the LTE packet may be successfully transmitted or recovered over the NR may have reduced impact on the performance of the data transmission, as the LTE traffic is buffered with relatively smaller size (e.g., less than 500 packets in this case).

The same idea may be equally applicable to an UL split when the UL PDCP packets are exchanged between the NR RLC and the LTE RLC entities in the uplink, if a pre-building model is adopted, the forward looking PDCP packet split may help the performance in the receiver heavily compared to transmitter.

The above examples of the first diagram 410 and the second diagram 420 of FIG. 4 provide that the faster link may be the NR connection and the slower link may be the LTE connection; however, the aspects of the current disclosure may not be limited thereto, and the faster link and the second link may be any form of communications or different RATs that are applicable to the current disclosure. In one aspect, the slower link may be an NR first frequency (FR1) frequency and the faster link may be an NR second frequency (FR2) frequency. In another aspect, the combination of the faster link and the slower link may include a combination of at least two of the NR FR1 RLC, NR FR2+ RLC, NR FR3 RLC, or NR FR4 RLC.

In some aspects, the first diagram 410 and the second diagram 420 of FIG. 4 may include a terrestrial link and a non-terrestrial link. The terrestrial link and the non-terrestrial link may be one of the faster link and the slower link based on coverage of the terrestrial link and the non-terrestrial link and a mobility of the connected UE. The terrestrial link may be provided from a stationary base station and the non-terrestrial link may be provided from a mobile base station, e.g., aircraft, unmanned aircraft system (UAS), satellite, etc. In one aspect, the terrestrial link may have a better coverage for a UE that is stationary or has a relatively low mobility, and the terrestrial link may be the fast link for the UE that stationary or has a relatively low mobility. In another aspect, the non-terrestrial link may have a better coverage for a moving UE, and the non-terrestrial link may be the fast link for the moving UE.

According to the current disclosure, the network may transmit the split bearer traffic between the different RATs or cells with different loading, scheduling, and/or resource constraint legs, and the scheduling delays on a slower leg may have reduced impact on the data arriving on the faster leg. This may help the receiver to deliver packets without much stress on memory and/or processing constraints, and also providing the communication environment with a reduced loss to upper layers, resulting in enhanced end-user experience. The method and apparatus may be equally applicable to UE UL split when packets are pre-built and transmitted in a dynamic way.

Figure 5:
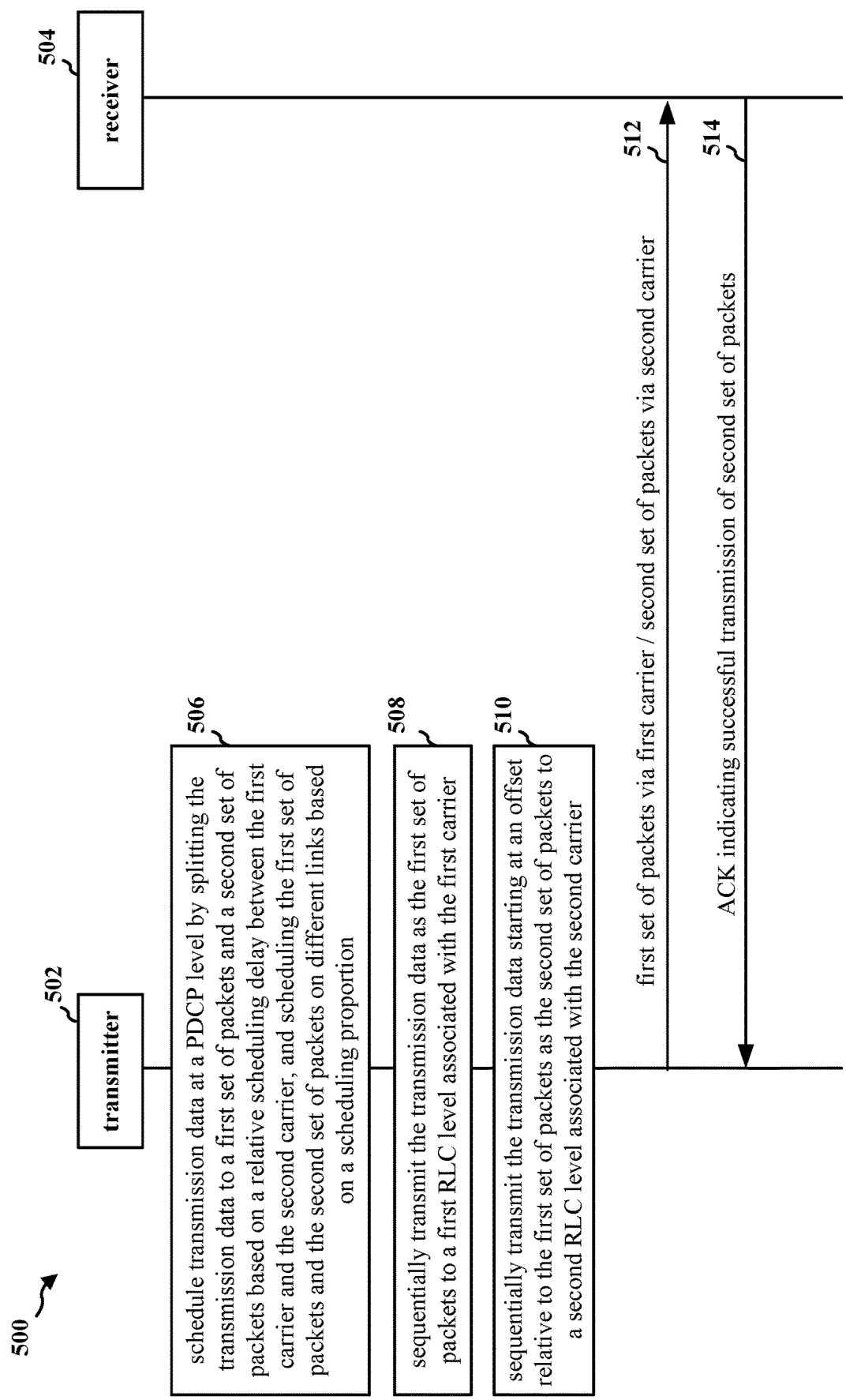
FIG. 5 is a communication diagram of a method wireless communication.

FIG. 5 is a communication diagram 500 of a method of wireless communication. The communication diagram 500 may include a transmitter 502 and a receiver 504. The transmitter 502 may be a base station or a UE. The transmitter 502 may be connected to the receiver 504 through a split carrier including a first carrier and a second carrier. The transmitter 502 may provide a forward looking PDCP scheduling between a set of packet and a second set of packets to reduce the bottleneck in the wireless communication.

At 506, the transmitter 502 may schedule transmission data at a PDCP level by splitting the transmission data to a first set of packets and a second set of packets based on a relative scheduling delay between the first carrier and the second carrier, and scheduling the first set of packets and the second set of packets on different links based on a scheduling proportion. The scheduling proportion between the first carrier and the second carrier may be determined based on at least one of loading, scheduling, or resource constraints of the first carrier and the second carrier, respectively.

Each of the first set of packets and the second set of packets may be one of a set of contiguous packets or a set of non-continuous packets. In one aspect, each of the first set of packets and the second set of packets may have the same size, or at least one packet of the first set of packets and the second set of packets may have a size different from another packets of the first set of packets and the second set of packets.

In another aspect, each of the first set of packets and the second set of packets may have the same traffic type or different traffic types. The traffic types may include at least one of an application, a logical channel, QoS, PDN, network slice type, or any user specific traffic type associated with the first set of packets and the second set of packets.

The first carrier may be for a first RAT and the second carrier may be for a second RAT. In one aspect, the first RAT and the second RAT may be the same RAT. In another aspect, the first RAT and the second RAT may be different RATs. For example, the first carrier may be a 5G NR FR1 carrier and the second carrier may be a 5G NR FR2 carrier, and the first carrier may be an LTE carrier and the second carrier may be a 5G NR carrier.

In some aspects, one carrier of the first carrier and the second carrier may be a terrestrial link and the other carrier of the first carrier and the second carrier may be a non-terrestrial link. That is, the terrestrial link and the non-terrestrial link may be one of the fast link and the slow link based on coverage of the terrestrial link and the non-terrestrial link and a mobility of the connected UE.

The relative scheduling delay between the first carrier and the second carrier may be based on a difference between a first scheduling delay of the first carrier and a second scheduling delay of the second carrier. The first scheduling delay and the second scheduling delay may be determined based on worst-case scheduling of the first carrier and the second carrier, respectively. In one aspect, the second scheduling delay of the second carrier may be greater than the first scheduling delay of the first carrier.

At 508, the transmitter 502 may sequentially transmit, to the receiver 504, the transmission data as the first set of packets to a first RLC level associated with the first carrier, where the offset may be determined based on the relative scheduling delay.

At 510, the transmitter 502 may sequentially transmit, to the receiver 504, the transmission data starting at an offset relative to the first set of packets as the second set of packets to a second RLC level associated with the second carrier, where the offset may be determined based on the relative scheduling delay. In one aspect, the transmission data may be sequentially transmitted at the offset relative to the first set of packets as the second set of packets to the second RLC level associated with the second carrier in response to the ACK signal received that may be received at 514.

At 512, the transmitter 502 may transmit, to the receiver 504, the first set of packets via the first carrier and the second set of packets via the second carrier. The transmitter 502 may transmit the transmission data including the first set of packets and the second set of packets based on the PDCP level scheduling at 506.

At 514, the transmitter 502 may receive, from the receiver 504, an ACK signal indicating a successful transmission of the second set of packets. In response to the ACK signal received from the receiver 504, the transmitter 502 may sequentially transmit the transmission data at the offset relative to the first set of packets as the second set of packets to the second RLC level associated with the second carrier at 510.

Figure 6:
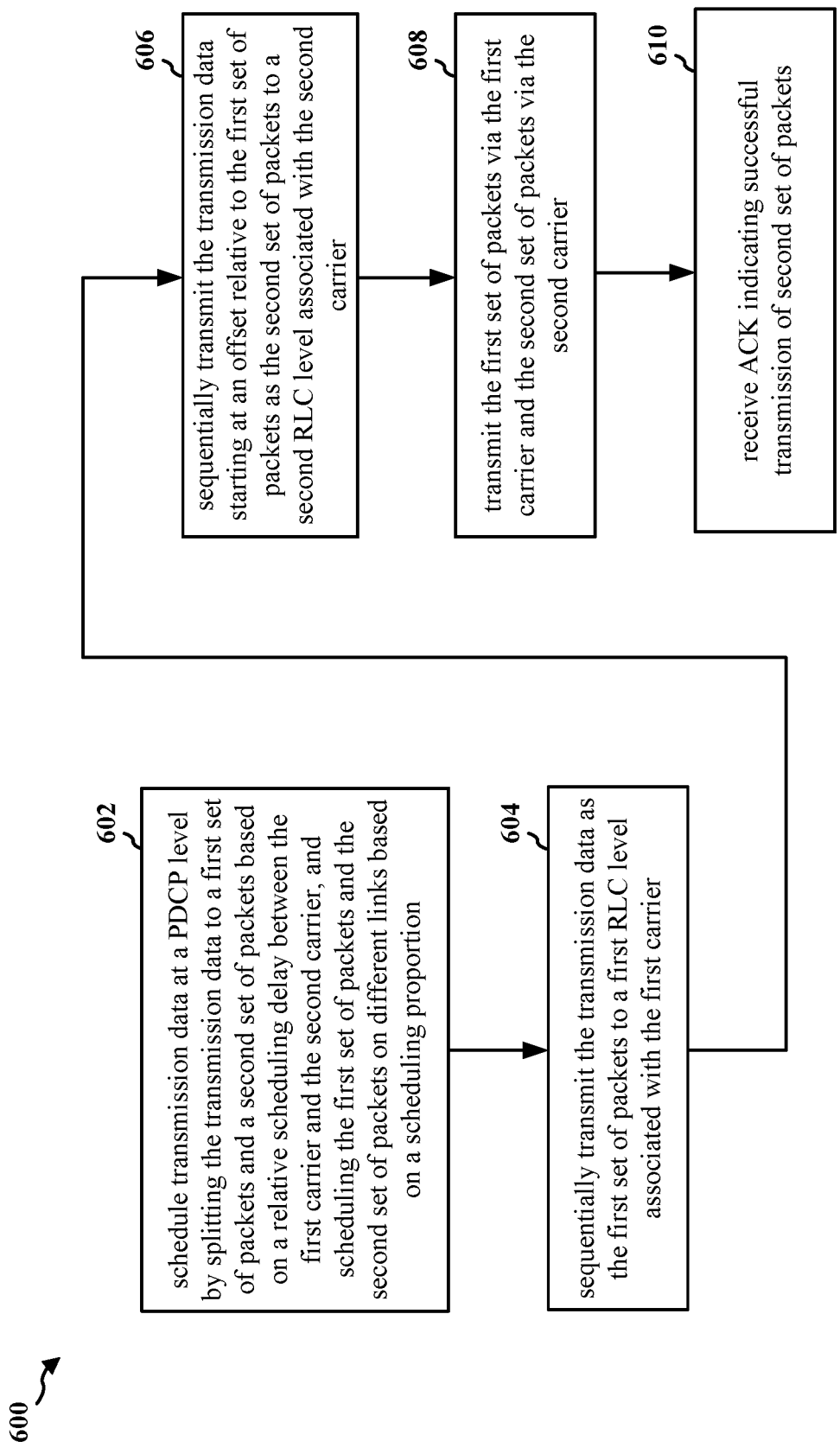
FIG. 6 is a flowchart of a method of wireless communication.

FIG. 6 is a flowchart 600 of a method of wireless communication. The method may be performed by a transmitter. The transmitter may be a UE (e.g., the UE 104; the apparatus 802) or a base station (e.g., the base station 102/180; transmitter 502; the apparatus 902).

At 602, the transmitter may schedule transmission data at a PDCP level by splitting the transmission data to a first set of packets and a second set of packets based on a relative scheduling delay between the first carrier and the second carrier, and scheduling the first set of packets and the second set of packets on different links based on a scheduling proportion. The scheduling proportion between the first carrier and the second carrier may be determined based on at least one of loading, scheduling, or resource constraints of the first carrier and the second carrier, respectively. For example, at 506, the transmitter 502 may schedule transmission data at a PDCP level by splitting the transmission data to a first set of packets and a second set of packets based on a relative scheduling delay between the first carrier and the second carrier, and scheduling the first set of packets and the second set of packets on different links based on a scheduling proportion. Furthermore, 602 may be performed by a split PDCP packet scheduling component 840 or a split PDCP packet scheduling component 940.

Each of the first set of packets and the second set of packets may be one of a set of contiguous packets or a set of non-continuous packets. In one aspect, each of the first set of packets and the second set of packets may have the same size, or at least one packet of the first set of packets and the second set of packets may have a size different from another packets of the first set of packets and the second set of packets.

In another aspect, each of the first set of packets and the second set of packets may have the same traffic type or different traffic types. The traffic types may include at least one of an application, a logical channel, QoS, PDN, network slice type, or any user specific traffic type associated with the first set of packets and the second set of packets.

The first carrier may be for a first RAT and the second carrier may be for a second RAT. In one aspect, the first RAT and the second RAT may be the same RAT. In another aspect, the first RAT and the second RAT may be different RATs. For example, the first carrier may be a 5G NR FR1 carrier and the second carrier may be a 5G NR FR2 carrier, and the first carrier may be an LTE carrier and the second carrier may be a 5G NR carrier.

In some aspects, one carrier of the first carrier and the second carrier may be a terrestrial link and the other carrier of the first carrier and the second carrier may be a non-terrestrial link. That is, the terrestrial link and the non-terrestrial link may be one of the fast link and the slow link based on coverage of the terrestrial link and the non-terrestrial link and a mobility of the connected UE.

The relative scheduling delay between the first carrier and the second carrier may be based on a difference between a first scheduling delay of the first carrier and a second scheduling delay of the second carrier. The first scheduling delay and the second scheduling delay may be determined based on worst-case scheduling of the first carrier and the second carrier, respectively. In one aspect, the second scheduling delay of the second carrier may be greater than the first scheduling delay of the first carrier.

At 604, the transmitter may sequentially transmit, to the receiver, the transmission data as the first set of packets to a first RLC level associated with the first carrier, where the offset may be determined based on the relative scheduling delay. For example, at 508, the transmitter 502 may sequentially transmit, to the receiver 504, the transmission data as the first set of packets to a first RLC level associated with the first carrier, where the offset may be determined based on the relative scheduling delay. Furthermore, 604 may be performed by the split PDCP packet scheduling component 840 or the split PDCP packet scheduling component 940.

At 606, the transmitter may sequentially transmit, to the receiver, the transmission data starting at an offset relative to the first set of packets as the second set of packets to a second RLC level associated with the second carrier, where the offset may be determined based on the relative scheduling delay. In one aspect, the transmission data may be sequentially transmitted at the offset relative to the first set of packets as the second set of packets to the second RLC level associated with the second carrier in response to the ACK signal received that may be received at 610. For example, at 510, the transmitter 502 may sequentially transmit, to the receiver 504, the transmission data starting at an offset relative to the first set of packets as the second set of packets to a second RLC level associated with the second carrier, where the offset may be determined based on the relative scheduling delay. Furthermore, 606 may be performed by the split PDCP packet scheduling component 840 or the split PDCP packet scheduling component 940.

At 608, the transmitter may transmit, to the receiver, the first set of packets via the first carrier and the second set of packets via the second carrier. The transmitter 502 may transmit the transmission data including the first set of packets and the second set of packets based on the PDCP level scheduling at 602. For example, at 512, the transmitter 502 may transmit, to the receiver 504, the first set of packets via the first carrier and the second set of packets via the second carrier. Furthermore, 608 may be performed by the split PDCP packet scheduling component 840 or the split PDCP packet scheduling component 940.

At 610, the transmitter may receive, from the receiver, an ACK signal indicating a successful transmission of the second set of packets. In response to the ACK signal received from the receiver, the transmitter may sequentially transmit the transmission data at the offset relative to the first set of packets as the second set of packets to the second RLC level associated with the second carrier at 606. For example, at 514, the transmitter 502 may receive, from the receiver 504, an ACK signal indicating a successful transmission of the second set of packets. Furthermore, 610 may be performed by the split PDCP packet scheduling component 840 or the split PDCP packet scheduling component 940.

Figure 7:
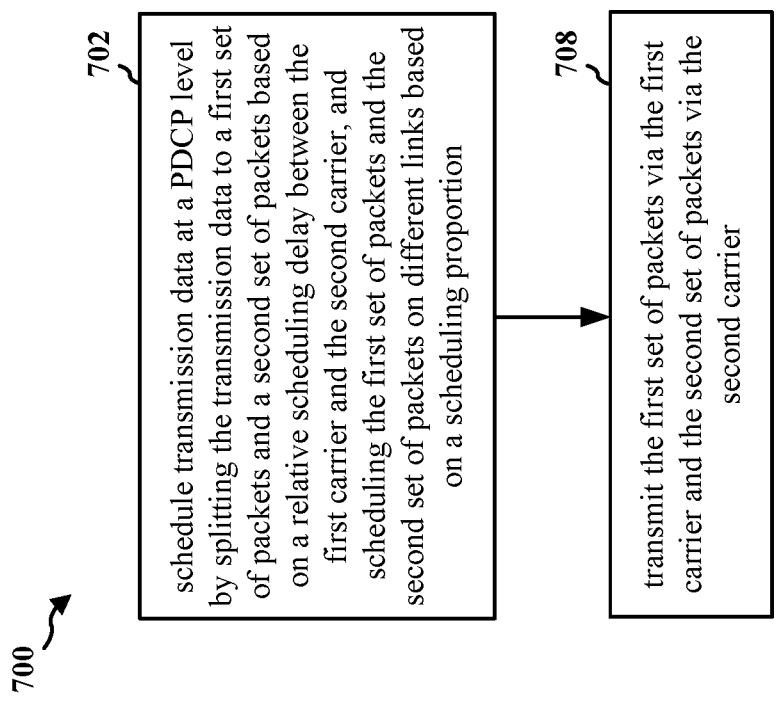
FIG. 7 is a flowchart of a method of wireless communication.

FIG. 7 is a flowchart 700 of a method of wireless communication. The method may be performed by a transmitter. The transmitter may be a UE (e.g., the UE 104; the apparatus 802) or a base station (e.g., the base station 102/180; transmitter 502; the apparatus 902).

At 702, the transmitter may schedule transmission data at a PDCP level by splitting the transmission data to a first set of packets and a second set of packets based on a relative scheduling delay between the first carrier and the second carrier, and scheduling the first set of packets and the second set of packets on different links based on a scheduling proportion. The scheduling proportion between the first carrier and the second carrier may be determined based on at least one of loading, scheduling, or resource constraints of the first carrier and the second carrier, respectively. For example, at 506, the transmitter 502 may schedule transmission data at a PDCP level by splitting the transmission data to a first set of packets and a second set of packets based on a relative scheduling delay between the first carrier and the second carrier, and scheduling the first set of packets and the second set of packets on different links based on a scheduling proportion. Furthermore, 702 may be performed by a split PDCP packet scheduling component 840 or a split PDCP packet scheduling component 940.

Each of the first set of packets and the second set of packets may be one of a set of contiguous packets or a set of non-continuous packets. In one aspect, each of the first set of packets and the second set of packets may have the same size, or at least one packet of the first set of packets and the second set of packets may have a size different from another packets of the first set of packets and the second set of packets.

In another aspect, each of the first set of packets and the second set of packets may have the same traffic type or different traffic types. The traffic types may include at least one of an application, a logical channel, QoS, PDN, network slice type, or any user specific traffic type associated with the first set of packets and the second set of packets.

The first carrier may be for a first RAT and the second carrier may be for a second RAT. In one aspect, the first RAT and the second RAT may be the same RAT. In another aspect, the first RAT and the second RAT may be different RATs. For example, the first carrier may be a 5G NR FR1 carrier and the second carrier may be a 5G NR FR2 carrier, and the first carrier may be an LTE carrier and the second carrier may be a 5G NR carrier.

In some aspects, one carrier of the first carrier and the second carrier may be a terrestrial link and the other carrier of the first carrier and the second carrier may be a non-terrestrial link. That is, the terrestrial link and the non-terrestrial link may be one of the fast link and the slow link based on coverage of the terrestrial link and the non-terrestrial link and a mobility of the connected UE.

The relative scheduling delay between the first carrier and the second carrier may be based on a difference between a first scheduling delay of the first carrier and a second scheduling delay of the second carrier. The first scheduling delay and the second scheduling delay may be determined based on worst-case scheduling of the first carrier and the second carrier, respectively. In one aspect, the second scheduling delay of the second carrier may be greater than the first scheduling delay of the first carrier.

At 708, the transmitter may transmit, to the receiver, the first set of packets via the first carrier and the second set of packets via the second carrier. The transmitter 502 may transmit the transmission data including the first set of packets and the second set of packets based on the PDCP level scheduling at 702. For example, at 512, the transmitter 502 may transmit, to the receiver 504, the first set of packets via the first carrier and the second set of packets via the second carrier. Furthermore, 708 may be performed by the split PDCP packet scheduling component 840 or the split PDCP packet scheduling component 940.

Figure 8:
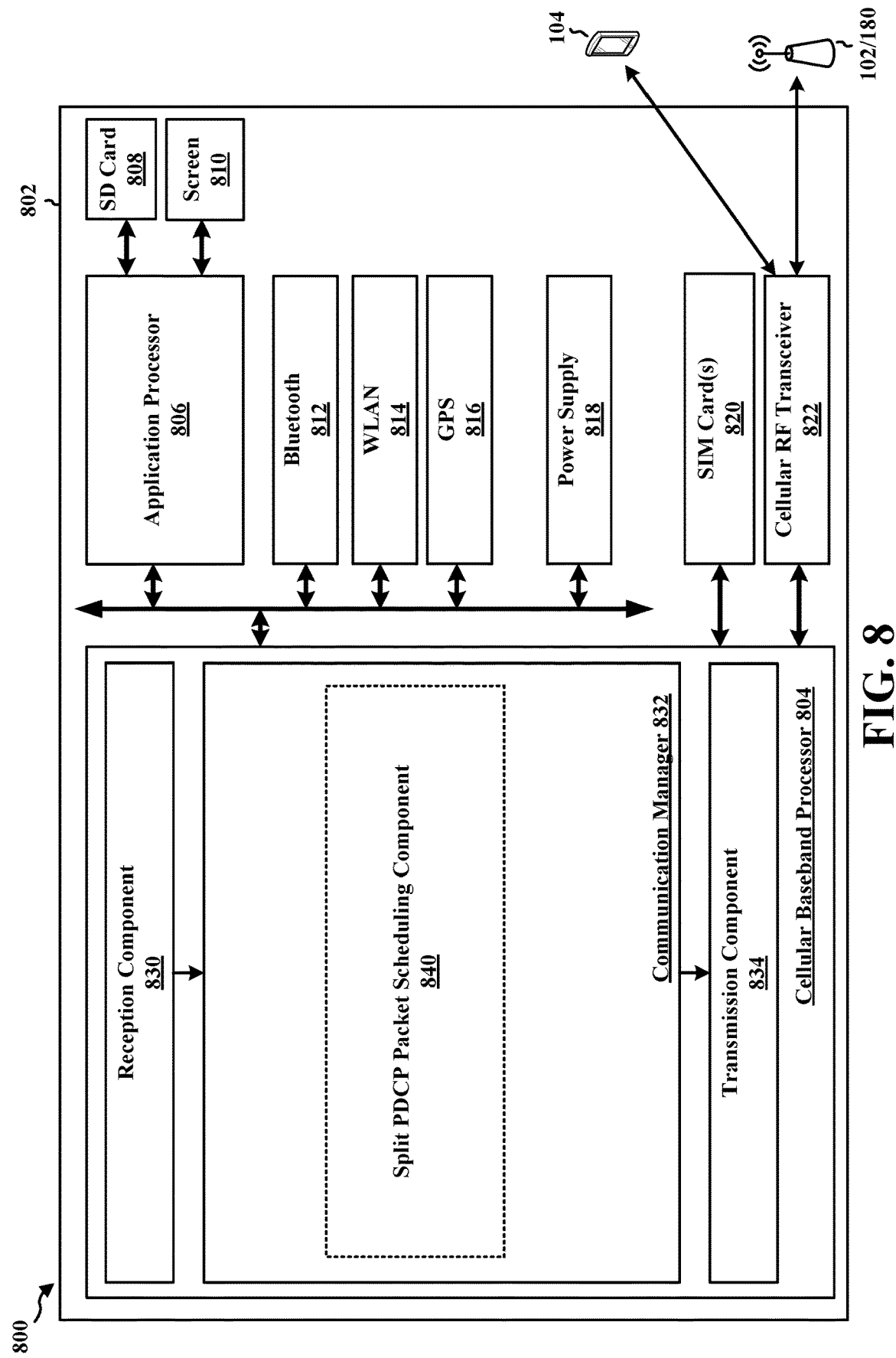
FIG. 8 is a diagram illustrating an example of a hardware implementation for an example apparatus.

FIG. 8 is a diagram 800 illustrating an example of a hardware implementation for an apparatus 802. The apparatus 802 may be a UE, a component of a UE, or may implement UE functionality. In some aspects, the apparatus 802 may include a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, or a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the additional modules of the apparatus 802.

The communication manager 832 includes a split PDCP packet scheduling component 840 that is configured to schedule transmission data at a PDCP level by splitting the transmission data to a first set of packets and a second set of packets based on a relative scheduling delay between the first carrier and the second carrier, and scheduling the first set of packets and the second set of packets on different links based on a scheduling proportion, sequentially transmit the transmission data as the first set of packets to a first RLC level associated with the first carrier, sequentially transmit the transmission data starting at an offset relative to the first set of packets as the second set of packets to a second RLC level associated with the second carrier, transmit the first set of packets via the first carrier and the second set of packets via the second carrier, and receive an ACK signal indicating a successful transmission of the second set of packets, e.g., as described in connection with 602, 604, 606, 608, 610, 702, and 708.

The apparatus may include additional components that perform each of the blocks of the algorithm in the flowcharts of FIGS. 5, 6, and 7. As such, each block in the flowcharts of FIGS. 5, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, includes means for scheduling transmission data at a PDCP level by splitting the transmission data to a first set of packets and a second set of packets based on a relative scheduling delay between the first carrier and the second carrier, and scheduling the first set of packets and the second set of packets on different links based on a scheduling proportion, and means for transmitting the first set of packets via the first carrier and the second set of packets via the second carrier. The apparatus 802 includes means for sequentially transmitting the transmission data as the first set of packets to a first RLC level associated with the first carrier, means for sequentially transmitting the transmission data starting at an offset relative to the first set of packets as the second set of packets to a second RLC level associated with the second carrier, and means for receiving an ACK signal indicating a successful transmission of the second set of packets. The means may be one or more of the components of the apparatus 802 configured to perform the functions recited by the means. As described supra, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

FIG. 9 is a diagram 900 illustrating an example of a hardware implementation for an apparatus 902. The apparatus 902 may be a base station, a component of a base station, or may implement base station functionality. In some aspects, the apparatus 802 may include a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The communication manager 932 includes a split PDCP packet scheduling component 940 that is configured to schedule transmission data at a PDCP level by splitting the transmission data to a first set of packets and a second set of packets based on a relative scheduling delay between the first carrier and the second carrier, and scheduling the first set of packets and the second set of packets on different links based on a scheduling proportion, sequentially transmit the transmission data as the first set of packets to a first RLC level associated with the first carrier, sequentially transmit the transmission data starting at an offset relative to the first set of packets as the second set of packets to a second RLC level associated with the second carrier, transmit the first set of packets via the first carrier and the second set of packets via the second carrier, and receive an ACK signal indicating a successful transmission of the second set of packets, e.g., as described in connection with 602, 604, 606, 608, 610, 702, and 708.

The apparatus may include additional components that perform each of the blocks of the algorithm in the flowcharts of FIGS. 5, 6, and 7. As such, each block in the flowcharts of FIGS. 5, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the baseband unit 904, includes means for scheduling transmission data at a PDCP level by splitting the transmission data to a first set of packets and a second set of packets based on a relative scheduling delay between the first carrier and the second carrier, and scheduling the first set of packets and the second set of packets on different links based on a scheduling proportion, and means for transmitting the first set of packets via the first carrier and the second set of packets via the second carrier. The apparatus 902 includes means for sequentially transmitting the transmission data as the first set of packets to a first RLC level associated with the first carrier, means for sequentially transmitting the transmission data starting at an offset relative to the first set of packets as the second set of packets to a second RLC level associated with the second carrier, and means for receiving an ACK signal indicating a successful transmission of the second set of packets. The means may be one or more of the components of the apparatus 902 configured to perform the functions recited by the means. As described supra, the apparatus 902 may include the TX Processor 316, the RX Processor 370, and the controller/processor 375. As such, in one configuration, the means may be the TX Processor 316, the RX Processor 370, and the controller/processor 375 configured to perform the functions recited by the means.

The apparatus may be a transmitter connected to a receiver through a split carrier including a first carrier and a second carrier, may be configured to schedule transmission data at a PDCP level by splitting the transmission data to a first set of packets and a second set of packets based on a relative scheduling delay between the first carrier and the second carrier, and scheduling the first set of packets and the second set of packets on different links based on a scheduling proportion, and transmit the first set of packets via the first carrier and the second set of packets via the second carrier. Each of the first set of packets and the second set of packets may be a set of contiguous packets or a set of non-continuous packets. Each of the first set of packets and the second set of packets has the same size or different sizes, and each of the first set of packets and the second set of packets has a same traffic type or different traffic types. Thus, the first set of packets and the second set of packets may be of any size. The first set of packets and the second set of packets may be for any packet type.

In some aspects, the first carrier may be for a first radio access technology (RAT) and the second carrier may be for a second RAT. The first RAT and the second RAT may be the same RAT or different RATs. In one aspect, the first RAT and the second RAT may be the same RAT or different RATs. For example, the first RAT maybe the 5G new radio (NR) and the second RAT may be a 4G long term evolution (LTE). The first RAT and the second RAT may be any RAT type. In another aspect, the first carrier and the second carrier may be part of a same frequency range or different frequency ranges. Thus, the first carrier and the second carrier may be carriers of any frequency range. For example, the first carrier may be the 5G NR first frequency range (FR1) carrier and the second carrier may be a 5G NR second frequency range (FR2) carrier. In another aspect, one carrier of the first carrier and the second carrier may be a terrestrial link and the other carrier of the first carrier and the second carrier may be a non-terrestrial link. Here, the relative scheduling delay between the first carrier and the second carrier may be based on a difference between a first scheduling delay of the first carrier and a second scheduling delay of the second carrier, and the first scheduling delay and the second scheduling delay may be determined based on a worst-case scheduling of the first carrier and the second carrier, respectively. Here, the second scheduling delay of the second carrier may be greater than the first scheduling delay of the first carrier. The transmitter may be configured to sequentially transmit the transmission data as the first set of packets to a first radio link control (RLC) level associated with the first carrier, and sequentially transmit the transmission data starting at an offset relative to the first set of packets as the second set of packets to a second RLC level associated with the second carrier, where the offset may be determined based on the relative scheduling delay. The scheduling proportion between the first carrier and the second carrier may be determined based on at least one of loading, scheduling, or resource constraints of the first carrier and the second carrier, respectively.

The transmitter may be further configured to receive an acknowledge (ACK) signal indicating a successful transmission of the second set of packets, and sequentially transmit, in response to receiving the ACK signal, the transmission data at the offset relative to the first set of packets as the second set of data to the second RLC level associated with the second carrier.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to schedule transmission data at a packet data convergence protocol (PDCP) level by splitting the transmission data to a first set of packets and a second set of packets based on a relative scheduling delay between the first carrier and the second carrier, and scheduling the first set of packets and the second set of packets on different links based on a scheduling proportion, and transmit the first set of packets via the first carrier and the second set of packets via the second carrier.

Aspect 2 is the apparatus of aspect 1, where each of the first set of packets and the second set of packets is one of a set of contiguous packets or a set of non-continuous packets.

Aspect 3 is the apparatus of any of aspects 1 and 2, where each of the first set of packets and the second set of packets has a same size.

Aspect 4 is the apparatus of any of aspects 1 to 3, where at least one packet of the first set of packets and the second set of packets has a size different from another packets of the first set of packets and the second set of packets.

Aspect 5 is the apparatus of any of aspects 1 to 4, where each of the first set of packets and the second set of packets has a same traffic type.

Aspect 6 is the apparatus of any of aspects 1 to 5, where each of the first set of packets and the second set of packets has different traffic types.

Aspect 7 is the apparatus of any of aspects 1 to 6, where the first carrier is for a first RAT and the second carrier is for a second RAT.

Aspect 8 is the apparatus of aspect 7, wherein the first carrier and the second carrier are part of a same frequency range.

Aspect 9 is the apparatus of aspect 7, wherein the first carrier and the second carrier are part of different frequency ranges.

Aspect 10 is the apparatus of aspect 7, where the first RAT and the second RAT are a same RAT.

Aspect 11 is the apparatus of aspect 7, where the first RAT and the second RAT are different RATs.

Aspect 12 is the apparatus of aspect 11, where the first carrier is a 5G NR FR1 carrier and the second carrier is a 5G NR FR2 carrier.

Aspect 13 is the apparatus of aspect 11, where one carrier of the first carrier and the second carrier is a terrestrial link and the other carrier of the first carrier and the second carrier is a non-terrestrial link.

Aspect 14 is the apparatus of any of aspects 1 to 13, where the relative scheduling delay between the first carrier and the second carrier is based on a difference between a first scheduling delay of the first carrier and a second scheduling delay of the second carrier.

Aspect 15 is the apparatus of aspect 14, where the first scheduling delay and the second scheduling delay are determined based on worst-case scheduling of the first carrier and the second carrier, respectively.

Aspect 16 is the apparatus of aspect 15, where the second scheduling delay of the second carrier is greater than the first scheduling delay of the first carrier.

Aspect 17 is the apparatus of aspect 16, where, to schedule the transmission data, the at least one processor coupled to the memory are configured to sequentially transmit the transmission data as the first set of packets to a first RLC level associated with the first carrier, and sequentially transmit the transmission data starting at an offset relative to the first set of packets as the second set of packets to a second RLC level associated with the second carrier, where the offset is determined based on the relative scheduling delay.

Aspect 18 is the apparatus of aspect 17, where the at least one processor coupled to the memory are further configured to receive an ACK signal indicating a successful transmission of the second set of packets, where and the transmission data is sequentially transmitted at the offset relative to the first set of packets as the second set of packets to the second RLC level associated with the second carrier in response to receiving the ACK signal.

Aspect 19 is the apparatus of any of aspects 1 to 18, further including a transceiver coupled to the at least one processor, where the scheduling proportion between the first carrier and the second carrier is determined based on at least one of loading, scheduling, or resource constraints of the first carrier and the second carrier, respectively.

Aspect 20 is a method of wireless communication for implementing any of aspects 1 to 19.

Aspect 21 is an apparatus for wireless communication including means for implementing any of aspects 1 to 19.

Aspect 22 is a computer-readable medium storing computer executable code, where the code when executed by a processor causes the processor to implement any of aspects 1 to 19.

What is claimed is:

1. An apparatus for wireless communication at a transmitter connected to a receiver through a split carrier comprising a first carrier and a second carrier, comprising:
   memory; and
   at least one processor coupled to the memory and configured to cause the apparatus to:
      schedule transmission data at a packet data convergence protocol (PDCP) level by splitting the transmission data to a first set of packets and a second set of packets based on a relative scheduling delay, associated with an offset for a configured time delay, between the first carrier and the second carrier, and scheduling the first set of packets and the second set of packets on different links based on a scheduling proportion and the offset for the configured time delay; and
      transmit the first set of packets, before the offset, via the first carrier and the second set of packets, after the offset, via the second carrier.

2. The apparatus of claim 1, wherein each of the first set of packets and the second set of packets is one of a set of contiguous packets or a set of non-contiguous packets.

3. The apparatus of claim 1, wherein each of the first set of packets and the second set of packets has a same size.

4. The apparatus of claim 1, wherein at least one packet of the first set of packets and the second set of packets has a size different from another packets of the first set of packets and the second set of packets.

5. The apparatus of claim 1, wherein each of the first set of packets and the second set of packets has a same traffic type.

6. The apparatus of claim 1, wherein each of the first set of packets and the second set of packets has different traffic types.

7. The apparatus of claim 1, wherein the first carrier is for a first radio access technology (RAT) and the second carrier is for a second RAT.

8. The apparatus of claim 7, wherein the first carrier and the second carrier are part of a same frequency range.

9. The apparatus of claim 7, wherein the first carrier and the second carrier are part of different frequency ranges.

10. The apparatus of claim 7, wherein the first RAT and the second RAT are a same RAT.

11. The apparatus of claim 7, wherein the first RAT and the second RAT are different RATs.

12. The apparatus of claim 11, wherein the first carrier is a 5G new radio (NR) first frequency range (FR1) carrier and the second carrier is a 5G NR second frequency range (FR2) carrier.

13. The apparatus of claim 11, wherein one carrier of the first carrier and the second carrier is a terrestrial link and the other carrier of the first carrier and the second carrier is a non-terrestrial link.

14. The apparatus of claim 1, wherein the relative scheduling delay between the first carrier and the second carrier is based on a difference between a first scheduling delay of the first carrier and a second scheduling delay of the second carrier.

15. The apparatus of claim 14, wherein the first scheduling delay and the second scheduling delay are determined based on worst-case scheduling of the first carrier and the second carrier, respectively.

16. The apparatus of claim 15, wherein the second scheduling delay of the second carrier is greater than the first scheduling delay of the first carrier.

17. The apparatus of claim 16, wherein, to schedule the transmission data, the at least one processor is configured to cause the apparatus:
sequentially transmit the transmission data as the first set of packets to a first radio link control (RLC) level associated with the first carrier; and
sequentially transmit the transmission data starting at the offset relative to the first set of packets as the second set of packets to a second RLC level associated with the second carrier, wherein the offset is determined based on the relative scheduling delay.

18. The apparatus of claim 17, wherein the at least one processor coupled to the memory is configured to cause the apparatus: receive an acknowledge (ACK) signal indicating a successful transmission of the second set of packets,
wherein and the transmission data is sequentially transmitted at the offset relative to the first set of packets as the second set of packets to the second RLC level associated with the second carrier in response to receiving the ACK signal.

19. The apparatus of claim 1, further comprising a transceiver coupled to the at least one processor,
wherein the scheduling proportion between the first carrier and the second carrier is determined based on at least one of loading, scheduling, or resource constraints of the first carrier and the second carrier, respectively.

20. The apparatus of claim 1, wherein the offset for the configured time delay is configured in association with a time gap between the first set of packets transmitted via the first carrier and the second set of packets transmitted via the second carrier.

21. A method of wireless communication at a transmitter connected to a receiver through a split carrier comprising a first carrier and a second carrier, comprising:
scheduling transmission data at a packet data convergence protocol (PDCP) level by splitting the transmission data to a first set of packets and a second set of packets based on a relative scheduling delay, associated with an offset for a configured time delay, between the first carrier and the second carrier, and scheduling the first set of packets and the second set of packets on different links based on a scheduling proportion and the offset for the configured time delay; and
transmitting the first set of packets, before the offset, via the first carrier and the second set of packets, after the offset, via the second carrier.

22. The method of claim 21, wherein each of the first set of packets and the second set of packets is one of a set of contiguous packets or a set of non-continuous packets.

23. The method of claim 21, wherein the first carrier is for a first radio access technology (RAT) and the second carrier is for a second RAT.

24. The method of claim 21, wherein the relative scheduling delay between the first carrier and the second carrier is based on a difference between a first scheduling delay of the first carrier and a second scheduling delay of the second carrier.

25. The method of claim 24, wherein the first scheduling delay and the second scheduling delay are determined based on worst-case scheduling of the first carrier and the second carrier, respectively.

26. The method of claim 25, wherein the second scheduling delay of the second carrier is greater than the first scheduling delay of the first carrier.

27. The method of claim 26, wherein scheduling the transmission data further comprises:
sequentially transmitting the transmission data as the first set of packets to a first radio link control (RLC) level associated with the first carrier; and
sequentially transmitting the transmission data starting at the offset relative to the first set of packets as the second set of packets to a second RLC level associated with the second carrier,
wherein the offset is determined based on the relative scheduling delay.

28. The method of claim 27, further comprising receiving an acknowledge (ACK) signal indicating a successful transmission of the second set of packets,
wherein and the transmission data is sequentially transmitted at the offset relative to the first set of packets as the second set of packets to the second RLC level associated with the second carrier in response to receiving the ACK signal.

29. The method of claim 21, wherein the scheduling proportion between the first carrier and the second carrier is determined based on at least one of loading, scheduling, or resource constraints of the first carrier and the second carrier, respectively.

30. An apparatus for wireless communication at a transmitter connected to a receiver through a split carrier comprising a first carrier and a second carrier, comprising:
means for scheduling transmission data at a packet data convergence protocol (PDCP) level by splitting the transmission data to a first set of packets and a second set of packets based on a relative scheduling delay, associated with an offset for a configured time delay, between the first carrier and the second carrier, and scheduling the first set of packets and the second set of packets on different links based on a scheduling proportion and the offset for the configured time delay; and
means for transmitting the first set of packets, before the offset, via the first carrier and the second set of packets, after the offset, via the second carrier.

31. A non-transitory computer-readable medium storing computer executable code at a transmitter connected to a receiver through a split carrier comprising a first carrier and a second carrier, the code when executed by at least one processor causes the at least one processor to:
schedule transmission data at a packet data convergence protocol (PDCP) level by splitting the transmission data to a first set of packets and a second set of packets based on a relative scheduling delay, associated with an offset for a configured time delay, between the first carrier and the second carrier, and scheduling the first set of packets and the second set of packets on different links based on a scheduling proportion and the offset for the configured time delay; and
transmit the first set of packets, before the offset, via the first carrier and the second set of packets, after the offset, via the second carrier.

* * * * *